US012732777B1

(12) United States Patent
Joseph et al.

(10) Patent No.: US 12,732,777 B1
(45) Date of Patent: Sep. 8, 2026

(54) GUIDED NAVIGATION INTO GEOFENCES

(71) Applicant: Amazon Technologies, Inc., Seattle, WA (US)

(72) Inventors: Raj Kumar Raj Joseph, Pickering (CA); Jagrati Shringi, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 143 days.

(21) Appl. No.: 18/533,941

(22) Filed: Dec. 8, 2023

(51) Int. Cl.
*H04W 4/021* (2018.01)
*G01C 21/20* (2006.01)
*H04W 4/024* (2018.01)

(52) U.S. Cl.
CPC ............ *H04W 4/024* (2018.02); *G01C 21/20* (2013.01); *H04W 4/021* (2013.01)

(58) Field of Classification Search
CPC ....... H04W 4/021; H04W 4/024; G01C 21/20
See application file for complete search history.

(56) References Cited

U.S. PATENT DOCUMENTS 6,748,317 B2 * 6/2004 Maruyama ............ G01C 21/20 701/433
9,207,092 B1 * 12/2015 Yamasaki .......... G01C 21/3697
9,743,239 B1 * 8/2017 Mishra .................. H04W 4/023
10,171,940 B1 * 1/2019 Greenberger ......... H04W 4/027
10,627,244 B1 * 4/2020 Lauka ................ G01C 21/3623
10,863,302 B2 * 12/2020 Gonzalez .............. H04W 4/021
11,115,629 B1 * 9/2021 Lemberger .............. G10L 13/00
11,416,958 B1 * 8/2022 Reichert ............... H04W 4/029
11,922,364 B2 * 3/2024 Hess .................. G06Q 10/0833
11,941,572 B1 * 3/2024 Ravichandran ......... H04W 4/38
2006/0145837 A1 * 7/2006 Horton ................... G08G 1/202 340/539.13
2011/0178811 A1 * 7/2011 Sheridan ................. H04W 4/02 705/1.1
2017/0176208 A1 * 6/2017 Chung ................... H04N 7/183
2021/0133665 A1 * 5/2021 Hsiao .................... H04W 4/029
2021/0192443 A1 * 6/2021 Hess ..................... H04W 4/029
2023/0206168 A1 * 6/2023 Suzuki .................. H04W 4/025
2024/0071078 A1 * 2/2024 Carder ................... G06V 20/20

* cited by examiner

*Primary Examiner* — Dino Kujundzic
(74) *Attorney, Agent, or Firm* — K&L Gates LLP

(57) ABSTRACT

Devices and techniques are generally described for guided navigation into geofences. In various examples, a GUI of an application executing on a mobile device may display a first geofence surrounding a first delivery or pickup location. A reported location of the mobile device may be displayed on the GUI. A first navigation direction indicating a direction in which to walk to enter the first geofence may be determined. A first directional indicator may be displayed on the GUI indicating the first navigation direction. A determination may be made that the mobile device has entered the first geofence. First confirmation data indicating that a delivery to the first delivery address has been completed may be generated by the mobile device based at least in part on the mobile device having entered the first geofence.

20 Claims, 6 Drawing Sheets

Hardblock geofence

Guided Navigation into geofence

Determine navigation direction between reported location of mobile device and closest point on geofence boundary 250

→

Display navigation direction indicating direction to travel to enter geofence (with steps) 260

Softblock geofence

Guided Navigation into geofence

Determine navigation direction between reported location of mobile device and closest point on geofence boundary 250

→

Display navigation direction indicating direction to travel to enter geofence (with steps) 260

GUIDED NAVIGATION INTO GEOFENCES

BACKGROUND

Large scale delivery platforms typically employ different shipment methods. In a last-mile context—where items are moved from a hub or depot to the final shipment address—delivery associates delivery packages to a wide variety of diverse locations. In some instances, delivery associates may be required to confirm to a delivery management system that a delivery has been made to the correct address and/or delivery location.

DETAILED DESCRIPTION

Figure 1:
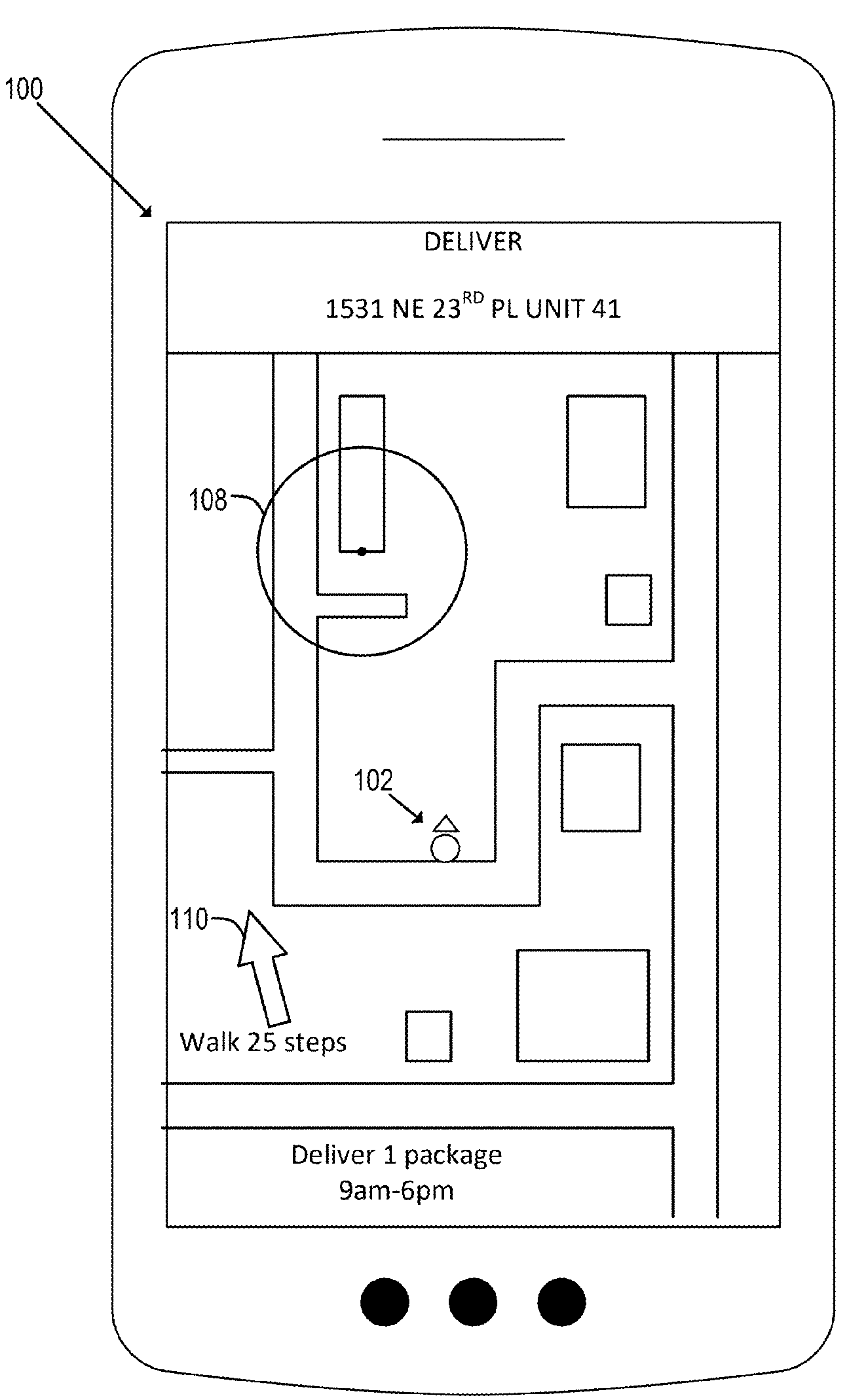
FIG. 1 depicts an example graphical user interface (GUI) of a mobile system depicting guided navigation into a geofence, according to various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In large-scale delivery systems, packages may be delivered to (and/or picked up from) a wide variety of different locations (e.g., delivery addresses). For example, deliveries may be made to single family homes, businesses, multi-tenant dwellings (e.g., duplexes, triplexes, apartment buildings, condominiums, etc.), multi-tenant office buildings, etc. In some cases, the appropriate place at which to leave a package during a delivery may be confusing to a delivery associate. Accordingly, certain technologies may be used to confirm that a delivery has been made to the appropriate location and/or to assist the delivery associate. For example, a delivery associate may be required to take a picture of the delivery location in order to confirm that the delivery was completed and to confirm the location at which one or more packages were left. Many examples discussed herein describe delivery scenarios. However, it should be noted that the various techniques described herein are equally applicable to pickup of packages. Accordingly, while delivery examples may be used for simplicity and brevity, it should be noted that the technology is equally-applicable to package pickups and pickup confirmations.

In some examples, a geofence may be used to confirm that a delivery associate has delivered a package to the appropriate location. A geofence may be a set of geolocation coordinates that define an enclosed boundary around a location (e.g., on a map application). In the case of delivery confirmation, the geofence may surround the desired delivery location for a given user (e.g., around the user's delivery address that may be specified through an e-commerce application associated with the package delivery). In some examples, a delivery associate may be required to be detected within a geofence (by determining that the reported location of the delivery associate's mobile device) before the delivery associate is able to confirm successful package delivery using the mobile device. The idea behind such geofence-based confirmation may help to guide the delivery associate to the appropriate home, apartment, business, etc., for package delivery. In theory, geofence-based delivery confirmation improves delivery quality since the delivery associate's mobile application will prevent the delivery associate from confirming delivery of a package to a wrong location (i.e., a location outside the geofence for the delivery).

However, in current systems, it can be confusing for the delivery associate to understand in which direction to move to enter the geofence for a given delivery. For example, current mobile application GUIs may or may not show only a vague geofence region on the map, and the delivery associate may not know in which direction to move and may be forced to walk around using trial-and-error by moving around the property. This may not only be unsafe, but may waste time and slow downstream deliveries. In some further cases, the delivery associate may be at the correct location for delivery, but the mobile device of the delivery associate may report an inaccurate location that is outside of the geofence (in spite of the delivery associate having made the delivery to the correct location). Such location inaccuracy may be a result of inaccurate global positioning data reported by the GNSS system of the mobile device. In such instances, the delivery associate may be required to move around until their reported location is determined to be within the geofence, at which point they may be able to confirm delivery using a selectable graphical control on the GUI. Such experiences often result in the delivery associate contacting a help center associated with the delivery platform to receive assistance. These calls sometimes require the delivery associate to convince the help-line operator that the package has indeed been delivered to the correct address and that there is an error either in the geofence coordinates or in the reported location of the delivery associate's mobile device. Such calls are time-consuming and expensive and result in latency of downstream deliveries and poor driver experience.

Described herein are systems and techniques that may be used to guide the delivery associate into the geofence even when there are inaccuracies in the reported location of the delivery associate's mobile device and/or the geofence coordinates or the location of the geopin for a particular delivery location. A "geopin" may refer to a specified location where a delivery is requested by a user (e.g., front door, garage, side entry, etc.). The geofence may be an enclosed area around the geopin to account for global navigation satellite system (GNSS) error and/or safety constraints. In various examples, the magnetometer of the delivery associate's mobile device may be used to determine a direction in which the delivery associate is facing at a given time. GNSS on the mobile device (e.g., a global positioning satellite (GPS) sensor) may be used to determine the distance between the mobile device and the closest point on the geofence boundary. The number of steps taken by the delivery associate may be tracked using the inertial measurement unit (IMU) of the delivery associate's mobile device in case they are traversing on foot. Accordingly, this data may be used to display a directional indicator (e.g., an arrow) on the map GUI displaying the direction in which the delivery associate should walk in order to enter the geofence and/or approach the geopin. Notably, this may be used to enable the delivery associate to confirm delivery even when the reported location of the delivery associate's mobile device is inaccurate (which can often be the case, particular when there is interference (such as when the delivery associate is surrounded by tall buildings in a dense urban environment) or the location of the geofence is inaccurate.

While many examples described herein discuss the delivery associate walking toward the geofence/geopin, the various systems and techniques described herein may also be used to ensure that the delivery associate drives to an appropriate location (again defined by a geofence and/or geopin) using a vehicle such as an automobile (or even potentially an aerial delivery device). For example, when the delivery associate arrives at a fulfillment center or delivery station the delivery associate may be tasked with driving to a particular area (defined by a geofence/geopin) such as a loading bay, check-in area, etc., to confirm that the delivery associate has arrived at the correct area. The various guided navigation techniques described herein may also be applicable to such examples.

In another example, a delivery service operating in a dense urban area may deliver groupings of packages to delivery associates that will then deliver these packages on foot, as parking of a delivery vehicle in such areas may be cumbersome. In such scenarios, a verification/confirmation may be required to ensure that the vehicle is parked in the correct location and the correct packages have been delivered to the appropriate "walker" (a delivery associate that delivers on foot). Accordingly, the driver of the vehicle may be required to drive into a predetermined location (e.g., a geopin and/or geofence defining an anchor point) where the driver is tasked with handing off the group of packages to the appropriate walker delivery associate at that location. The techniques described herein may guide the delivery driver and the walkers into the appropriate geofence in these scenarios as well (even when the driver's location reporting and/or the geofence location is inaccurate) to allow the delivery driver to confirm the handoff of the packages to the walking delivery associate.

In addition to the guided navigation into geofence techniques being used for walking pickup/delivery and/or driving pickup/delivery, these techniques may also apply to other transportation modalities (such as unmanned aerial vehicles (UAVs), boats, etc.). In the context of UAVs (whether manually controlled or autonomously piloted), geofences may optionally be three dimensional in nature (e.g., defining a relevant rooftop on which a package should be delivered). This can be used, for example, to ensure package delivery (and package delivery confirmation) at the correct balcony, mezzanine, rooftop, etc. In such cases, the guided navigation into the geofence may likewise be three dimensional (indicating whether the UAV should be moved upward or downward (in the z dimension) in order to confirm delivery/pickup).

Additionally, it should be noted that the various guided navigation examples discussed herein may be used in both online and offline situations. An online situation refers to examples where the mobile device of the delivery associate is able to connect to one or more communication networks (e.g., the Internet, cellular, etc.). Conversely, the offline situation refers to examples where the mobile device is unable to connect to any communication networks (e.g., where the device is in a remote area and has lost connectivity or where the device's wireless interface has been damaged). The offline mode may be particularly useful, as in such scenarios the delivery associate may not be able to call for assistance since they do not have cellular service.

Generally, in machine learned models such as neural networks that may implement various guided navigation into geofence components, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

In various examples, one or more machine learning models of the geofence navigation systems described herein may be used to determine the appropriate walking direction at a given time based on the current direction that the mobile device is facing, the location of the geofence boundary, the distance between the reported location of the mobile device and the geofence boundary, and/or any obstacles known from the map application that may impede the delivery associate from walking in a straight line toward the geofence boundary from the reported location of the mobile device. In various examples, such machine learning models may be executed locally on a mobile device carried by the delivery associate.

FIG. 1 depicts an example graphical user interface (GUI) 100 of a mobile system depicting guided navigation to a geopin, geofence, or other assigned delivery/pickup location, according to various aspects of the present disclosure. The GUI 100 may be an example GUI of a delivery application used to confirm deliveries by a delivery associate. The delivery application that provides the GUI may be executed on a mobile device (e.g., a smartphone, tablet, etc.) used by a delivery associate. As shown, the delivery application may include a map application and/or a building layout (e.g., for in-store delivery/pickup) that may display the current reported location 102 of the mobile device on which the delivery application is executing. As shown, the reported location 102 may include a directional indicator that indicates the direction that the mobile device is oriented. The directional indicator may be determined using a magnetometer and/or any directional guidance system of the mobile device.

In various examples, an IMU of the mobile device may include one or more of an accelerometer, gyroscope, directional information from Wifi/5G networks, and/or magnetometer. An accelerometer may be used to measure acceleration, which is the rate of change in the velocity of the mobile device. The magnetometer may be used to detect the orientation (e.g., orientation data) of the mobile device relative to the Earth's gravity. The accelerometer may be used to detect motion and/or vibration. In various examples, the acceleration data provided by the accelerometer may be used to determine the number of steps needed to each the boundary of the geofence 108.

Gyroscopes measure angular velocity, which is the rate of change of an object's orientation. Gyroscopes may be used to detect rotation and/or changes in orientation of the mobile device. Magnetometers measure the strength and direction of magnetic fields and can be used as a compass to determine the direction a device is oriented (e.g., facing). In combination, an accelerometer, gyroscope, and magnetometer can provide a rich set of data about the mobile device's orientation, movement, and/or surroundings.

Although the geofence 108 is displayed as a circle, the geofence 108 may be of any shape (e.g., a polygonal geofence). The data provided by the IMU may be used to determine the direction between the current reported location 102 of the mobile device and the closest point on the boundary of the geofence 108. A directional indicator 110 (e.g., an arrow) may be displayed on the GUI 100 to indicate the direction in which the delivery associate should walk in order to enter the geofence 108. Additionally, location data generated by the GNSS system and enhanced by other systems (e.g., 5G, Wifi, GTK) of the mobile device may be used to determine a distance between the reported location 102 of the mobile device and the geofence 108. This distance (which may be in meters or some other unit) may be converted into a number of steps that the delivery associate should walk (in the indicated direction) in order to enter the geofence 108. The step size of the delivery associate may be determined using accelerometer data generated by the IMU of the mobile device. Accordingly, the number of steps displayed may be tailored to the particular delivery associate's stride length.

Although not shown in FIG. 1, there may be a selectable graphical control on the GUI 100 that may be selected in order to confirm delivery. However, this selectable graphical control may only be selected when the reported location 102 is within the geofence 108. For example, the selectable graphical control may be "grayed out" until the reported location 102 is within the geofence 108. The guided geofence navigation system shown and described with respect to FIG. 1 may assist the delivery associate in confirming a delivery even when the reported location 102 is inaccurate and/or the location of the geofence 108 is inaccurate, since only the relative location of the reported location 102 and the geofence 108 is used to enable selection of the delivery confirmation selectable graphical control. For example, the delivery associate may have delivered the package to the appropriate location (e.g., the front door of a residence) and the geofence 108 may be around the appropriate location, but the reported location 102 may be reporting that the delivery associate is at a different location that is not near the appropriate location. The directional indicator 110 may show the delivery associate the direction in which to walk so that their mobile device displays their reported location 102 within the geofence 108 enabling the delivery associate to confirm the delivery. In another example, the location of the geofence 108 may be inaccurate, requiring the delivery associate to walk to an area that is unrelated to a place where the package should actually be delivered (e.g., a side of a house, down the street, etc.) in order to confirm the delivery. However, the directional indicator 110 may assist the delivery associate with reaching such an area to confirm the delivery (even though the delivery associate may have delivered the package to the appropriate location).

It should be noted that traditional map application often "snap" the reported location 102 to a closest vector (where the vectors are typically the roads and/or streets used during navigation). However, for a delivery application in which the delivery associate often needs to walk to locations that may not have roads/streets, it is important that the reported location 102 not be snapped to a road vector.

Figure 2A:
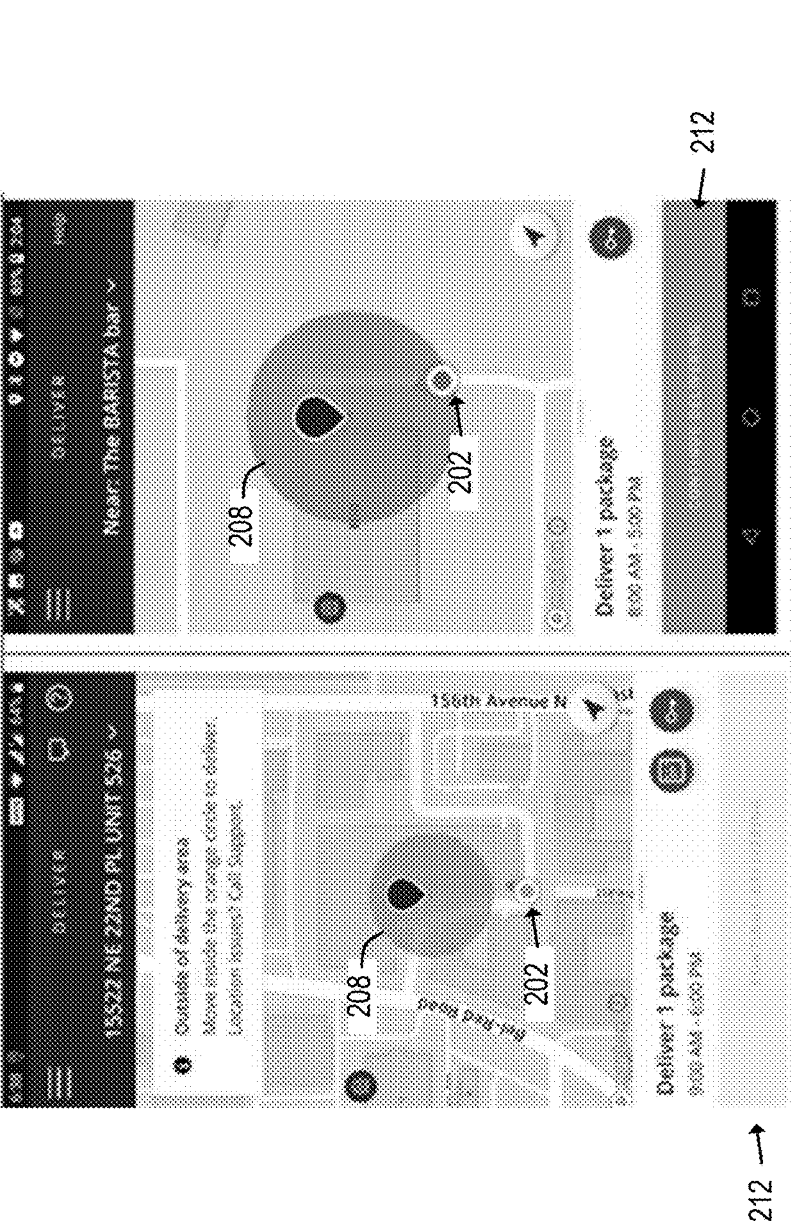
FIG. 2A contrasts hard-block geofence delivery confirmation with guided geofence navigation, in accordance with various embodiments of the present disclosure.

FIG. 2A contrasts hard-block geofence delivery confirmation with guided geofence navigation, in accordance with various embodiments of the present disclosure. Some previous mobile delivery applications required the mobile device of the delivery associate be detected within the geofence 208 (i.e., that the reported location 202 is within the geofence 208) prior to enabling delivery confirmation. For example, in FIG. 2A the selectable graphical control 212 used for delivery confirmation is grayed out until the reported location 202 is detected within the geofence 208. However, such interfaces did not provide any directional indicator or other guidance to assist the delivery associate in reaching the geofence. This can cause issues when there are inaccuracies in the reported location 202, the location of the geopin, shape/size of geofence 208, and/or the reported orientation of the mobile device. Accordingly, such "hard-block" geofence systems often cause frustrating experiences for the delivery associate and/or calls to delivery assistance help lines, which delay further package deliveries that impacts deliver associate productivity and morale.

In a guided geofence navigation architecture (such as the one depicted in FIG. 1), the delivery application on the mobile device of the delivery associate may instead determine a navigation direction between the reported location 202 of the mobile device and the closest or preferred point on the geofence 208 boundary (action 250). The magnetometer and/or gyroscope may be used to determine the current direction that the mobile device is facing. The navigation direction to the closest or preferred point on the geofence 208 boundary may be determined relative to the direction that the mobile device is facing. For example, if the mobile device is facing due North and the closest point on the geofence 208 boundary is due West, the navigation direction may point due West on the GUI. At action 260, the navigation direction (e.g., directional indicator 110 of FIG. 1) may be displayed on the GUI, indicating a direction to travel to enter the geofence 208. In various examples, the number of steps needed to reach the geofence 208 may also be displayed. As previously described, the number of steps may be tailored to the particular delivery associate's stride (as determined using accelerometer data) and may be dynamically updated based on the distance between the current reported location 202 and the geofence 208 boundary. While many examples herein describe navigation to the closest point on the geofence 208 boundary (relative to the reported location 202), it should be noted that navigation may instead be in reference to a different point on the geofence 208 boundary or within an interior of the geofence 208 (e.g., a central point within the geofence 208).

Figure 2B:
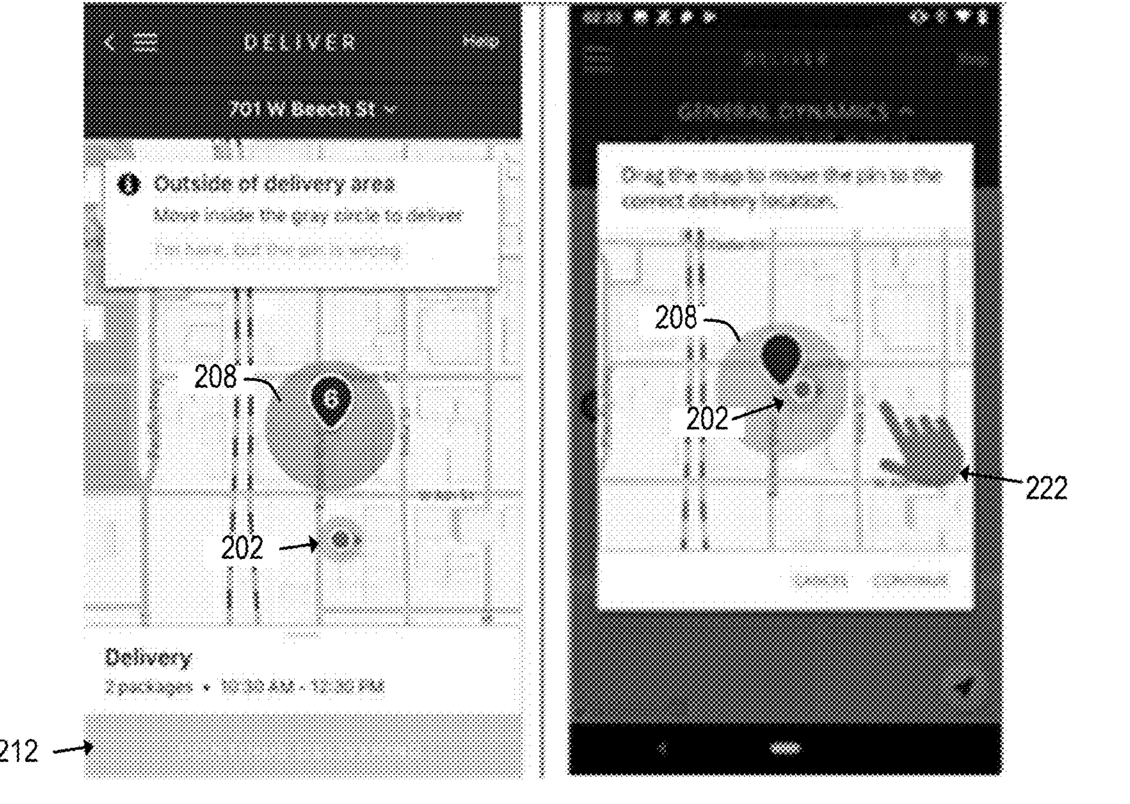
FIG. 2B contrasts soft-block geofence delivery confirmation with guided geofence navigation, in accordance with various embodiments of the present disclosure.

FIG. 2B contrasts soft-block geofence delivery confirmation with guided geofence navigation, in accordance with various embodiments of the present disclosure. In some example mobile delivery applications, the requirements of the hard-block geofence delivery confirmation (in which delivery associates were prevented from confirming deliveries until the reported location 202 of the mobile device is within the geofence 208) are relaxed to enable the delivery associate to change the location of the geofence 208 (sometimes referred to as "GPS spoofing") and/or the reported location 202, so that the delivery associate can confirm delivery. For example, the delivery associate may use a touch input 222 to drag the map to move the geofence 208 and/or the reported location 202. However, such "self-reporting" may lead to inaccurate delivery locations and/or fraudulent reporting. Accordingly, the guided geofence navigation systems described herein (and illustrated in FIG. 1) may use a hard-block system with navigational guidance.

In a guided geofence navigation architecture (such as the one depicted in FIG. 1), the delivery application on the mobile device of the delivery associate may instead determine a navigation direction between the reported location 202 of the mobile device and the closest point on the geofence 208 boundary (action 250). The magnetometer and/or gyroscope may be used to determine the current direction that the mobile device is facing. The navigation direction to the closest point on the geofence 208 boundary may be determined relative to the direction that the mobile device is facing. At action 260, the navigation direction (e.g., directional indicator 110 of FIG. 1) may be displayed on the GUI, indicating a direction to travel to enter the geofence 208. In various examples, the number of steps needed to reach the geofence 208 may also be displayed.

Figure 3:
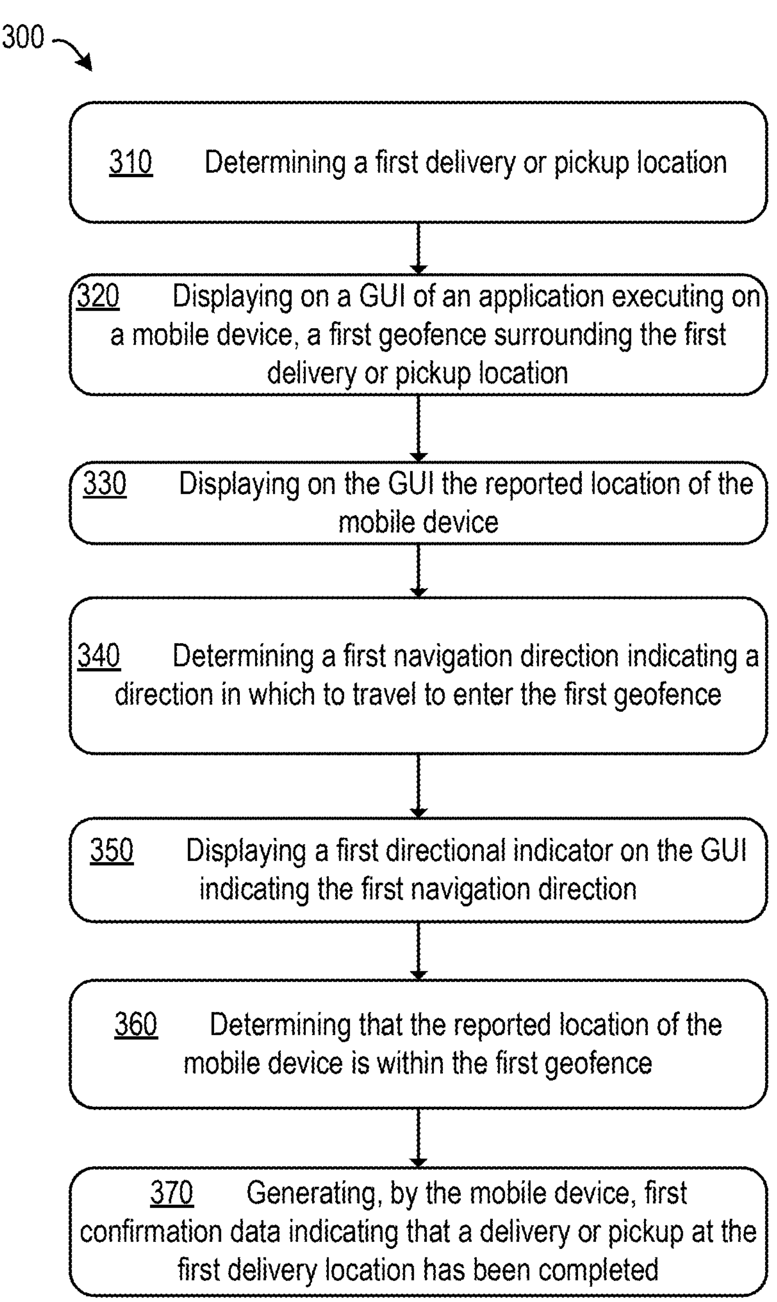
FIG. 3 depicts a flow chart showing an example process for guided navigation into geofences, according to various embodiments of the present disclosure.

FIG. 3 depicts a flow chart showing an example process 300 for guided navigation into geofences, according to various embodiments of the present disclosure. Those portions of FIG. 3 that have been previously discussed in reference to FIGS. 1-2 may not be described again for purposes of clarity and brevity. The actions of the flow chart depicted in FIG. 3 may represent a series of instructions and/or operations comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 300 may begin at action 310, at which a first delivery or pickup location may be determined. For example, the mobile application executing on the delivery associate's mobile device may have a list of delivery or pickup addresses and/or locations at which deliveries/pickups are to be made by the delivery associate. The first delivery or pickup location at action 310 may be a mailing address specified by a customer and/or a predefined delivery/pickup location either selected by the customer or automatically assigned.

Processing may continue to action 320, at which a first geofence surrounding the first delivery or pickup location may be displayed on a GUI of the delivery application executing on the mobile device of the delivery associate. The first geofence may be accurate or inaccurate. The first geofence may be of any shape and may define a bounded area on the GUI map application of the delivery/pickup application.

Processing may continue to action 330, at which the reported location of the mobile device may be displayed. As shown in FIG. 1, a directional indicator (e.g., an orientation) of the reported location may also be displayed in order to indicate the reported orientation of the mobile device (reported by the IMU and/or magnetometer of the mobile device).

Processing may continue at action 340, at which a first navigation direction indicating a direction in which to travel to enter the first geofence may be determined. For example, the direction of some portion (e.g., a closest point on the geofence boundary, the center of the geofence interior, etc.) of the geofence relative to the current orientation of the mobile device may be determined.

Processing may continue at action 350, at which a first directional indicator may be displayed on the GUI. The first directional indicator may indicate the first navigation direction. The first directional indicator may be an arrow, chevron, illustrated path, etc., that may be used by the delivery associate to determine a direction in which to travel in order to reach the geofence. In various examples, the number of steps to walk (or a determined distance) to reach the geofence may also be displayed to inform the delivery associate of the approximate distance to the geofence. The number of steps may be tailored to the stride length of the delivery associate, which may be determined using the accelerometer data of the mobile device.

Processing may continue at action 360, at which the reported location of the mobile device may be determined to be within the first geofence and/or to within a threshold distance from the geopin. For example, the delivery associate may have walked in the direction indicated by the first directional indicator (e.g., for the prescribed number of steps, avoiding any obstacles) in order to reach the geofence.

Processing may continue at action 370, at which the mobile device may generate first confirmation data indicating that a delivery or pickup at the first delivery or pickup address has been completed. For example, once the reported location of the mobile device of the delivery associate is detected within the geofence, the delivery associate may select a selectable graphical control on the GUI to confirm delivery/pickup. Selection of the selectable graphical control may generate confirmation data that may be sent to a cloud-based delivery tracking system for confirmation and order status tracking.

Figure 4:
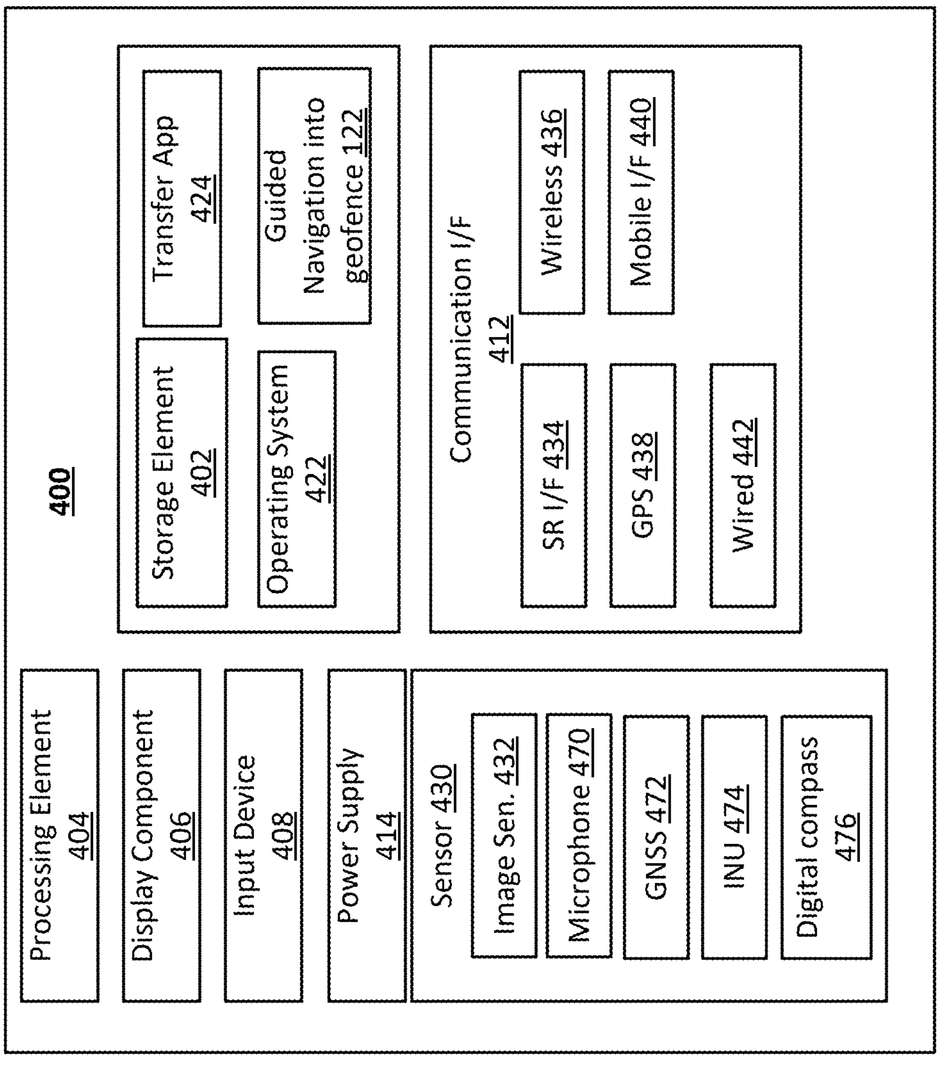
FIG. 4 is a block diagrams showing an example architecture of a computing device that may be used in accordance with various embodiments described herein.

FIG. 4 is a block diagram showing an example architecture 400 of a computing device that may be used for guided navigation into geofences, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400.

The guided navigation into geofence component 122 may be effective to perform one or more of the guided navigation techniques described herein in reference to FIGS. 1-3. When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 604, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information. Additionally, the sensors 430 may include the various navigational and/or motion-related sensors discussed herein. For example, sensors 430 may include the GNSS 472 (e.g., a GPS sensor), an inertial navigation unit (INU 474), a digital compass 476, the magnetometer and/or accelerometer discussed previously (not shown in FIG. 4), etc.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 5:
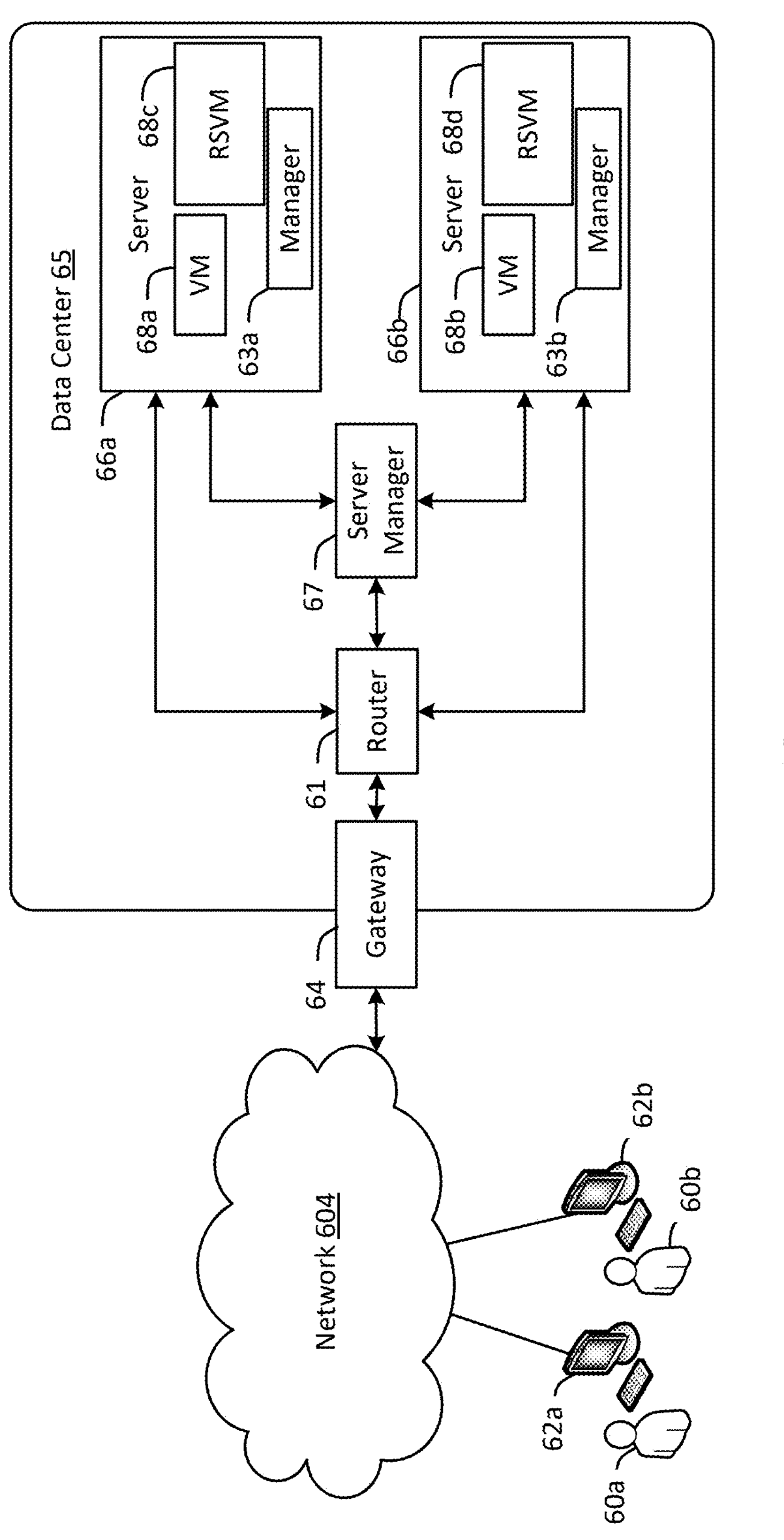
FIG. 5 is a diagram illustrating an example system for sending and providing data that may be used in accordance with the present disclosure.

An example system for guided navigation into geofences will now be described in detail. In particular, FIG. 5 illustrates an example computing environment in which the embodiments described herein may be implemented. For example, the computing environment of FIG. 5 may be used to predict and automatically provide guided navigation into geofences and/or order confirmation as a service over a network wherein one or more of the techniques described herein may be requested by a first computing device and may be performed by a different computing device configured in communication with the first computing device over a network. FIG. 5 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 5 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 5, a router 61 may be utilized to interconnect the servers 66*a* and 66*b*. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 5, a data center 65 is also employed to at least in part direct various communications to, from and/or between servers 66*a* and 66*b*. While FIG. 5 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 65 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:

receiving, from a network connected delivery system, first delivery or pickup instructions comprising requirements for delivery or pick up and a first delivery or pickup address;

determining, based on the first delivery or pickup instructions, a first geopin representing a requested delivery or pickup location defined by a first user;

displaying on a graphical user interface (GUI) of an application executing on a mobile device, a first geofence surrounding the first geopin, wherein the first geofence is defined by the first user;

displaying on the GUI of the application a reported location of the mobile device;

determining a first navigation direction corresponding to a direction in which to walk to enter the first geofence;

displaying a first arrow on the GUI indicating the first navigation direction;

determining that the mobile device has entered the first geofence; and sending, by the mobile device to the network connected delivery system, first confirmation data indicating that a delivery or pickup to the first delivery or pickup address has been completed based at least in part on the mobile device having entered the first geofence.

2. The computer-implemented method of claim 1, further comprising:

determining a first number of steps to take in order to enter the first geofence when walking in the first navigation direction; and displaying the first number of steps on the GUI.

3. The computer-implemented method of claim 1, further comprising:

receiving, by a first user device, updated first delivery or pickup instructions;

generating an updated first geofence, wherein the updated first geofence includes the first geopin.

4. The computer-implemented method of claim 1, wherein the reported location represents an inaccurate location of the mobile device due to an inaccuracy of global positioning data associated with the mobile device.

5. A method comprising:

receiving, from a network-connected delivery tracking system, first delivery or pickup instructions comprising at least a first delivery or pickup location;

determining, using the first delivery or pickup instructions, a first user-defined geofence;

displaying on a graphical user interface (GUI) of an application executing on a mobile device, the first geofence surrounding the first delivery or pickup location;

displaying on the GUI of the application a reported location of the mobile device;

determining a first navigation direction indicating a first direction in which to travel to enter the first geofence;

displaying a first directional indicator on the GUI indicating the first navigation direction;

determining that the reported location of the mobile device is within the first geofence;

generating, by the mobile device, first confirmation data indicating that a delivery or pickup at the first delivery or pickup location has been completed based at least in part on the mobile device having entered the first geofence; and sending, by the mobile device, the first confirmation data to the delivery tracking system.

6. The method of claim 5, further comprising:

determining a first direction associated with an orientation of the mobile device; and displaying orientation data indicating the first direction on the GUI in association with the reported location.

7. The method of claim 6, wherein the first directional indicator points toward a location of first geofence relative to the first direction.

8. The method of claim 5, further comprising:

determining a first number of steps to take in order to enter the first geofence when walking in the first navigation direction; and displaying the first number of steps on the GUI.

9. The method of claim 5, further comprising:

receiving a first request to confirm delivery or pickup from the mobile device while the mobile device is located at the reported location; and preventing, in response to the first request, delivery or pickup confirmation due to the mobile device being located outside of the first geofence.

10. The method of claim 9, further comprising:

receiving a second request to confirm delivery or pickup from the mobile device while the mobile device is within the first geofence; and generating the first confirmation data in response to the second request due to the mobile device being detected within the first geofence.

11. The method of claim 5, further comprising:

determining a second delivery or pickup location; and displaying on Previously Presented a display of the GUI a second geofence surrounding the second delivery or pickup location.

12. The method of claim 5, wherein the reported location represents an inaccurate location of the mobile device due to an inaccuracy of global positioning data associated with the mobile device.

13. The method of claim 5, further comprising:

receiving, by a first user device, updated first delivery or pickup instructions comprising a first geopin;

generating, an updated first geofence surrounding the first geopin.

14. A system comprising:

at least one processor;

a display; and non-transitory computer-readable memory storing instructions that, when executed by the at least one processor, are effective to:

receive, from a network-connected delivery tracking system, first delivery or pickup instructions comprising at least a first delivery or pickup location;

determine, using the first delivery or pickup instructions, a first user-defined geofence display, on the display, a graphical user interface (GUI) comprising the first geofence surrounding the first delivery or pickup location;

display on the GUI a reported location of the system;

determine a first navigation direction indicating a direction in which to travel to enter the first geofence;

display a first directional indicator on the GUI indicating the first navigation direction;

determine that the reported location of the system is within the first geofence;

generate first confirmation data indicating that a delivery or pickup at the first delivery or pickup location has been completed based at least in part on the system having entered the first geofence; and send the first confirmation data to the delivery tracking system.

15. The system of claim 14, the non-transitory computer-readable memory storing further instructions that, when executed by the at least one processor, are further effective to:

determine a first direction associated with an orientation of the system; and displaying orientation data indicating the first direction on the GUI in association with the reported location.

16. The system of claim 15, wherein the first directional indicator points toward a location of first geofence relative to the first direction.

17. The system of claim 14, the non-transitory computer-readable memory storing further instructions that, when executed by the at least one processor, are further effective to:

determine a first number of steps to take in order to enter the first geofence when walking in the first navigation direction; and display the first number of steps on the GUI.

18. The system of claim 14, the non-transitory computer-readable memory storing further instructions that, when executed by the at least one processor, are further effective to:

receive a first request to confirm delivery or pickup from a mobile device while the system is located at the reported location; and prevent, in response to the first request, delivery or pickup confirmation due to the system being located outside of the first geofence.

19. The system of claim 18, the non-transitory computer-readable memory storing further instructions that, when executed by the at least one processor, are further effective to:

receive a second request to confirm delivery or pickup from a mobile device while the system is within the first geofence; and generating the first confirmation data in response to the second request due to the system being detected within the first geofence.

20. The system of claim 14, wherein the reported location represents an inaccurate location of the system due to an inaccuracy of global positioning data associated with the system.

* * * * *